United States Patent
Garcia et al.

(10) Patent No.: US 11,867,334 B2
(45) Date of Patent: Jan. 9, 2024

(54) PLASTIC COOLANT FITTINGS FOR HYBRID MODULE APPLICATIONS

(71) Applicant: Schaeffler Technologies AG & Co. KG, Herzogenaurach (DE)

(72) Inventors: Ricardo Humberto Garcia, Puebla (MX); John Ramsey, Mansfield, OH (US); Richard Fraley, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 40 days.

(21) Appl. No.: 17/567,951

(22) Filed: Jan. 4, 2022

(65) Prior Publication Data

US 2023/0175627 A1 Jun. 8, 2023

Related U.S. Application Data

(60) Provisional application No. 63/277,883, filed on Nov. 10, 2021.

(51) Int. Cl.
*F16L 43/00* (2006.01)

(52) U.S. Cl.
CPC .................. *F16L 43/008* (2013.01)

(58) Field of Classification Search
CPC .................................................. F16L 43/008
See application file for complete search history.

(56) References Cited

U.S. PATENT DOCUMENTS

| | | | | |
|---|---|---|---|---|
| 4,072,328 A | * | 2/1978 | Elliott | F16L 37/091 285/302 |
| 5,636,875 A | * | 6/1997 | Wasser | F16L 47/02 285/332 |
| 8,840,148 B2 | * | 9/2014 | Defilippi | G01L 19/0007 285/133.4 |
| 2006/0022466 A1 | * | 2/2006 | Sand | F16L 23/006 285/412 |
| 2006/0255590 A1 | * | 11/2006 | Ludeman | B29C 66/52291 285/288.1 |
| 2016/0018037 A1 | * | 1/2016 | Nichols | B29C 66/1312 285/125.1 |
| 2018/0094760 A1 | | 4/2018 | Zinkand et al. | |

FOREIGN PATENT DOCUMENTS

| | | |
|---|---|---|
| CN | 110030056 A | 7/2019 |
| CN | 112555070 A | 3/2021 |
| CN | 213598096 U | 7/2021 |
| DE | 102020108138 A1 | 9/2021 |
| WO | 2005060612 A2 | 7/2005 |

* cited by examiner

*Primary Examiner* — James M Hewitt, II

(57) ABSTRACT

A plastic coolant fitting for a hybrid module includes an upper coolant tube with a first straight section and a rounded section, and a lower coolant tube with a second straight section fixed to the rounded section by spin welding. The rounded section may include a ring-shaped groove and the second straight section may include a ring-shaped protrusion installed in the ring-shaped groove. Prior to spin welding, the ring-shaped groove and the ring-shaped protrusion may include respective complementary trapezoidal cross-sections.

16 Claims, 2 Drawing Sheets

PLASTIC COOLANT FITTINGS FOR HYBRID MODULE APPLICATIONS

CROSS-REFERENCE TO RELATED APPLICATIONS

This application claims the benefit of U.S. Provisional Patent Application No. 63/277,883, filed Nov. 10, 2021, the disclosure of which is incorporated in its entirety by reference herein.

TECHNICAL FIELD

The present disclosure relates generally to a plastic coolant fitting, and more specifically to a plastic coolant fitting for hybrid module applications.

BACKGROUND

Cooling channels for hybrid drives are known. One example is shown and described in commonly-assigned German Patent Application Publication No. DE 10 2020 108 138 A1 titled "Sammelschiene für kombinierte Strom- and Kühlmittelleitung; sowie Antriebseinheit" (Busbar for combined power and coolant line; as well as drive unit) to Wagner, et al.

SUMMARY

Example embodiments broadly comprise a plastic coolant fitting for a hybrid module including an upper coolant tube with a first straight section and a rounded section, and a lower coolant tube with a second straight section fixed to the rounded section by spin welding. In some example embodiments, the rounded section includes a ring-shaped groove and the second straight section includes a ring-shaped protrusion installed in the ring-shaped groove. In an example embodiment, prior to spin welding, the ring-shaped groove and the ring-shaped protrusion include respective complementary trapezoidal cross-sections.

In some example embodiments, the upper coolant tube and the lower coolant tube are manufactured from different materials. In an example embodiment, the upper coolant tube is manufactured by injection molding a 30% glass fiber reinforced polyamide 66 material, and the lower coolant tube is manufactured by injection molding a polyamide 66 material.

In some example embodiments, the lower coolant tube includes a first distal end with an annular disk and the ring-shaped protrusion extends axially from the annular disk. In some example embodiments, the plastic coolant fitting also includes a face seal arranged on an underside of the annular disk, opposite the ring-shaped protrusion. In an example embodiment, the face seal is made from ethylene propylene diene monomer rubber. In some example embodiments, the plastic coolant fitting also includes an o-ring seal. The lower coolant tube includes a second distal end, opposite the first distal end, and an annular groove disposed at the second distal end, and the o-ring seal is installed in the annular groove. In an example embodiment, the o-ring seal is made from ethylene propylene diene monomer rubber.

In some example embodiments, the upper coolant tube also includes a first mounting flange for fixing to a housing of the hybrid module. In some example embodiments, the first mounting flange is arranged at a third distal end of the rounded section and includes the ring-shaped groove. In an example embodiment, the lower coolant tube includes a first distal end with an annular disk, and an annular surface of the annular disk is aligned with a mounting surface of the first mounting flange. In an example embodiment, the first mounting flange includes a first aperture and a first metal compression limiter tube installed in the first aperture. The first metal compression limiter tube is arranged to receive a first fastener for fixing the first mounting flange to the housing and to prevent deformation of the first mounting flange when the first fastener is tightened.

In some example embodiments, the upper coolant tube further includes a second mounting flange including a second aperture and a second metal compression limiter tube installed in the second aperture. The second metal compression limiter tube is arranged to receive a second fastener for fixing the second mounting flange to the housing and to prevent deformation of the second mounting flange when the second fastener is tightened. In an example embodiment, the second mounting flange is arranged on the first straight section. In an example embodiment, the upper coolant tube also includes a coolant tip for receiving a coolant hose, and the coolant tip is arranged at a fourth distal end of the first straight section, opposite the rounded section.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
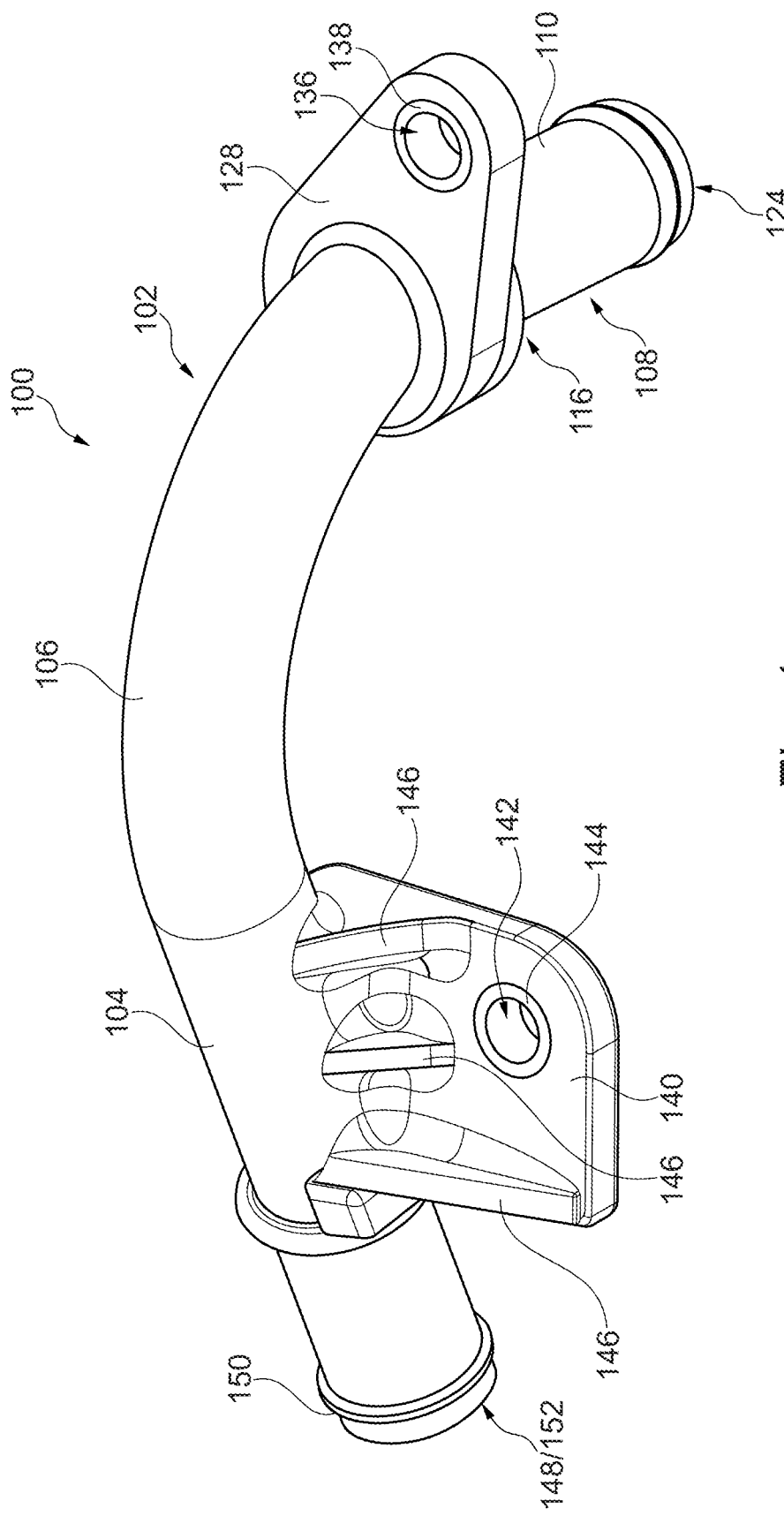
FIG. 1 illustrates a perspective view of a plastic coolant fitting for a hybrid module according to an example aspect of the present disclosure.
Figure 2:
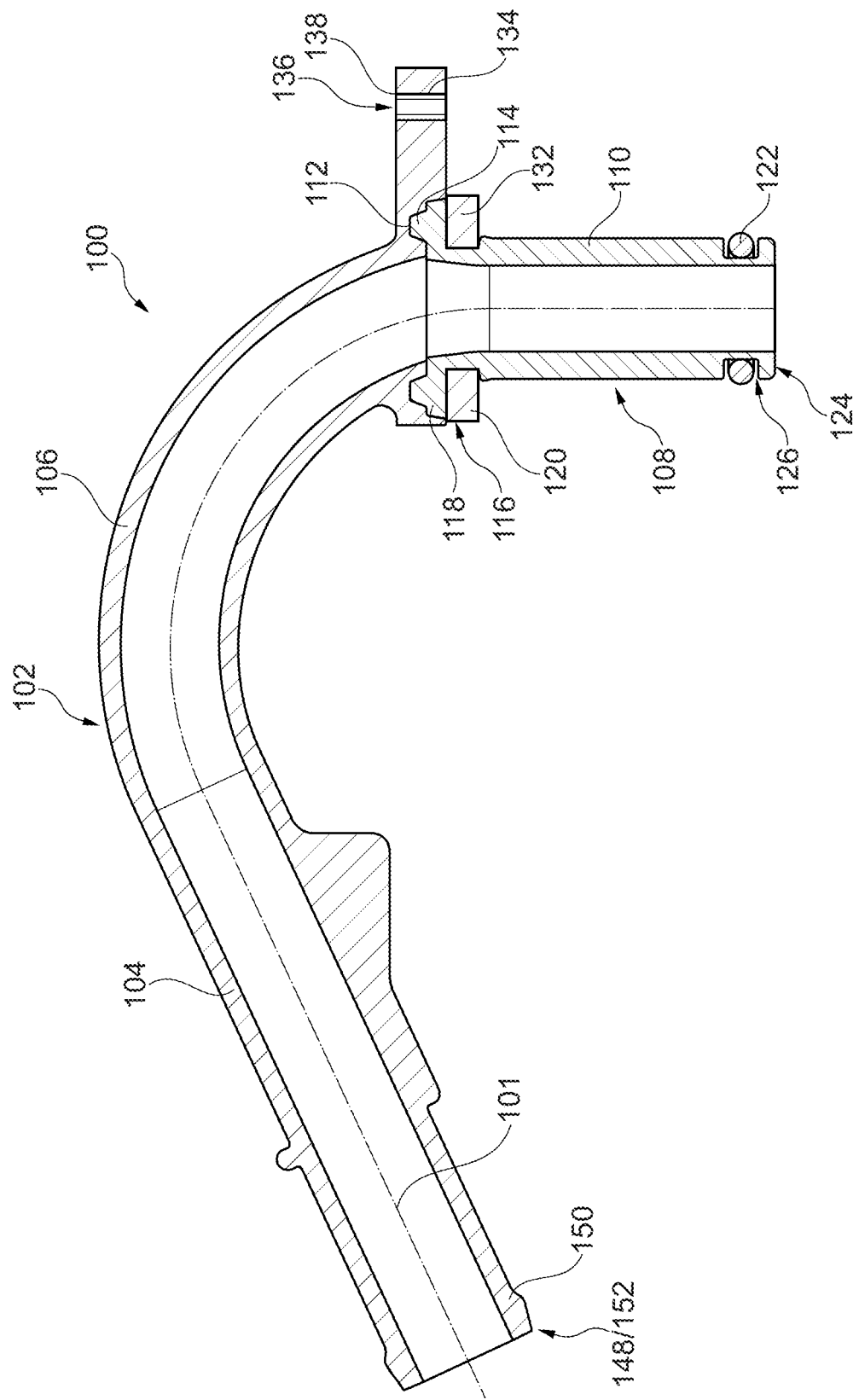
FIG. 2 illustrates a cross-sectional view of the plastic coolant fitting of FIG. 1.

The following description is made with reference to FIG. 1 and FIG. 2. FIG. 1 illustrates a perspective view of plastic coolant fitting 100 for a hybrid module according to an example aspect of the present disclosure. FIG. 2 illustrates a cross-sectional view of plastic coolant fitting 100 of FIG. 1. Plastic coolant fitting 100 includes axis 101, upper coolant tube 102 with straight section 104 and rounded section 106, and lower coolant tube 108 with straight section 110 fixed to rounded section 106 by spin welding. That is, the two tubes are formed separately and connected by rotating one of the tubes (e.g., tube 108) at high speed and holding the other tube (e.g., tube 102) stationary. When the two tubes are brought together, friction between the spinning tube and the stationary tube creates heat that melts (or "welds") the two components together, creating a mechanical connection and a fluid-tight seal between the two tubes.

As best seen in FIG. 2, rounded section 106 includes ring-shaped groove 112 and straight section 110 includes ring-shaped protrusion 114 installed in the ring-shaped groove. These features aid alignment and provide additional surface area for the spin welding operation. Prior to spin welding, the ring-shaped groove and the ring-shaped protrusion include respective complementary trapezoidal cross-sections. In order to maximize durability and minimize cost, the upper coolant tube and the lower coolant tube are manufactured from different materials. That is, the upper coolant tube is manufactured by injection molding a 30% glass fiber reinforced polyamide 66 material (i.e., PA66 GF30) and the lower coolant tube is manufactured by injection molding a polyamide 66 material (i.e., PA66). The glass fiber reinforced material in the upper coolant tube improves durability of mounting flanges and a coolant tip discussed in more detail below. Lower cost PA66 material is used for the lower coolant tube because it is secured by the upper coolant tube and inserted into the housing, so durability is less of a concern.

Manufacturing the tubes as separate pieces allows them to be injected molded in an economical manner. For example, when manufacturing the upper tube, separate inserts are used to form inner diameters of straight section 104 and rounded section 106. As expected, removing the insert from the straight section is relatively easy as the insert can be removed by extracting it from the tube in an axial direction. Removing the insert from the rounded tube, however, is more difficult because the insert must be "rolled" out of the rounded tube. Removing the insert would be much more difficult if the lower tube was formed together with the upper tube because the rounded tube insert could not be rolled out. Therefore, by molding the coolant fitting as separate components, the complexity of manufacturing of the individual components is reduced.

Lower coolant tube 108 includes distal end 116 with annular disk 118 and the ring-shaped protrusion extends axially from the annular disk. Plastic coolant fitting 100 also includes face seal 120 arranged on an underside of the annular disk, opposite the ring-shaped protrusion. The face seal is arranged to seal the annular disk to a housing of the hybrid module. That is, since the coolant tube passes through the housing to provide a coolant flow to an electric motor of the module, for example, the coolant tube must be sealed to housing to prevent fluid within the housing (e.g., oil) from leaking. The face seal contact a flat surface (not shown) of the housing and is compressed by a bolt securing a flange of the plastic coolant fitting to the housing as discussed in more detail below. In the embodiment shown, the face seal is made from ethylene propylene diene monomer rubber, or EPDM.

Plastic coolant fitting 100 includes o-ring seal 122. The lower coolant tube includes distal end 124, opposite distal end 116, and annular groove 126 disposed at distal end 124. O-ring seal 122 is installed in the annular groove. Similar to the face seal, the o-ring seal is made from ethylene propylene diene monomer rubber (EPDM).

Upper coolant tube 102 also includes mounting flange 128 for fixing to a housing of the hybrid module. Mounting flange 128 is arranged at distal end 130 of the rounded section and includes the ring-shaped groove. That is, the ring-shaped groove is formed on a flat surface of the mounting flange arranged for securing the plastic coolant fitting to the housing. Annular disk 118 includes annular surface 132 with mounting surface 134 of mounting flange 128. Mounting flange 128 includes aperture 136 and metal compression limiter tube 138 installed in aperture 136. Metal compression limiter tube 138 is arranged to receive a fastener (not shown) for fixing mounting flange 128 to the housing and to prevent deformation of the mounting flange when the fastener is tightened.

Upper coolant tube 102 also includes mounting flange 140 with aperture 142 and metal compression limiter tube 144 installed in aperture 142. Metal compression limiter tube 144 is arranged to receive a fastener (not shown) for fixing mounting flange 140 to the housing and to prevent deformation of mounting flange 140 when the fastener is tightened. Mounting flange 140 is arranged on straight section 104. Molded gussets 146 add additional strength to the connection between mounting flange 140 and straight section 104. Upper coolant tube 102 also includes coolant tip 148 for receiving a coolant hose (not shown). That is, the coolant tip includes annular ring 150 arranged to grip the coolant hose and a clamp or other securing device may be used to secure the coolant hose to the plastic coolant fitting, for example. The coolant tip is arranged at distal end 152 of straight section 104, opposite the rounded section.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Plastic coolant fitting
101 Axis
102 Upper coolant tube
104 Straight section (first)
106 Rounded section 108 Lower coolant tube
110 Straight section
112 Ring-shaped groove
114 Ring-shaped protrusion
116 Distal end (first, lower coolant tube)
118 Annular disk
120 Face seal
122 O-ring seal
124 Distal end (second, lower coolant tube)
126 Annular groove
128 Mounting flange (first)
130 Distal end (third, upper coolant tube)
132 Annular surface (annular disk)
134 Mounting surface (first mounting flange)
136 Aperture (first, first mounting flange)
138 Metal compression limiter tube (first)
140 Mounting flange (second)
142 Aperture (second, second mounting flange)
144 Metal compression limiter tube (second)
146 Molded gussets
148 Coolant tip
150 Annular ring
152 Distal end (fourth, first straight section)

What is claimed is:

1. A plastic coolant fitting for a hybrid module, comprising:
an upper coolant tube comprising:
a first straight section;
a rounded section comprising a first distal end; and
a first mounting flange, the first mounting flange being arranged at the first distal end and comprising a mounting surface; and
a lower coolant tube comprising:
a second straight section fixed to the rounded section by spin welding; and
a second distal end comprising an annular disk, having a ring-shaped protrusion extending therefrom, the annular disk comprising an annular surface aligned with the mounting surface; and
a face seal being arranged on an underside of the annular disk, opposite the ring-shaped protusion.

2. The plastic coolant fitting of claim 1 wherein the rounded section comprises a ring-shaped groove and the second straight section comprises a ring-shaped protrusion installed in the ring-shaped groove.

3. The plastic coolant fitting of claim 2 wherein, prior to spin welding, the ring-shaped groove and the ring-shaped protrusion comprise respective complementary trapezoidal cross-sections.

4. The plastic coolant fitting of claim 2 wherein the upper coolant tube and the lower coolant tube are manufactured from different materials.

5. The plastic coolant fitting of claim 4 wherein:
the upper coolant tube is manufactured by injection molding a 30% glass fiber reinforced polyamide 66 material; and
the lower coolant tube is manufactured by injection molding a polyamide 66 material.

6. The plastic coolant fitting of claim 2 wherein the ring-shaped protrusion extends axially from the annular disk.

7. The plastic coolant fitting of claim 6 further comprising an o-ring seal, wherein:
the lower coolant tube comprises a third distal end, opposite the second distal end, and an annular groove disposed at the third distal end; and
the o-ring seal is installed in the annular groove.

8. The plastic coolant fitting of claim 7 wherein the o-ring seal is made from ethylene propylene diene monomer rubber.

9. The plastic coolant fitting of claim 1 wherein the face seal is made from ethylene propylene diene monomer rubber.

10. The plastic coolant fitting of claim 1 wherein the first mounting flange comprises:
a first aperture; and
a first metal compression limiter tube installed in the first aperture, wherein:
the first metal compression limiter tube is arranged to receive a first fastener for fixing the first mounting flange to a housing of the hybrid module and to prevent deformation of the first mounting flange when the first fastener is tightened.

11. The plastic coolant fitting of claim 1 wherein the upper coolant tube further comprises a second mounting flange comprising:
a second aperture; and
a second metal compression limiter tube installed in the second aperture, wherein:
the second metal compression limiter tube is arranged to receive a second fastener for fixing the second mounting flange to a housing of the hybrid module and to prevent deformation of the second mounting flange when the second fastener is tightened.

12. The plastic coolant fitting of claim 11 wherein the second mounting flange is arranged on the first straight section.

13. The plastic coolant fitting of claim 2 wherein:
the upper coolant tube further comprises a coolant tip for receiving a coolant hose; and
the coolant tip is arranged at a fourth distal end of the first straight section, opposite the rounded section.

14. A plastic coolant fitting for a hybrid module, comprising:
an upper coolant tube comprising a first straight section and a rounded section, the rounded section comprising a ring-shaped groove;
a lower coolant tube comprising a second straight section fixed to the rounded section by spin welding, the second straight section comprising:
a first distal end with an annular disk; and
a ring-shaped protrusion extending axially from the annular disk and installed in the ring-shaped groove; and
a face seal made from ethylene propylene diene monomer rubber arranged on an underside of the annular disk, opposite the ring-shaped protrusion.

15. A plastic coolant fitting for a hybrid module, comprising:
an upper coolant tube comprising:
a first straight section;
a rounded section comprising a ring-shaped groove;
a first mounting flange; and
a second mounting flange arranged on the first straight section; and
a lower coolant tube comprising a second straight section fixed to the rounded section by spin welding, the second straight section comprising a ring-shaped protrusion extending axially from an annular disk and installed in the ring-shaped groove, and further comprising a face seal being arranged on an underside of the annular disk, opposite the ring-shaped protrusion.

16. The plastic coolant fitting of claim 15 wherein:
the first mounting flange comprises:
- a first aperture; and
- a first metal compression limiter tube installed in the first aperture;

the first metal compression limiter tube is arranged to receive a first fastener for fixing the first mounting flange to a housing of the hybrid module and to prevent deformation of the first mounting flange when the first fastener is tightened;

the second mounting flange comprises:
- a second aperture; and
- a second metal compression limiter tube installed in the second aperture; and the second metal compression limiter tube is arranged to receive a second fastener for fixing the second mounting flange to the housing and to prevent deformation of the second mounting flange when the second fastener is tightened.

* * * * *